United States Patent [19]
Lewin

[11] Patent Number: 5,172,803
[45] Date of Patent: Dec. 22, 1992

[54] CONVEYOR BELT WITH BUILT-IN MAGNETIC-MOTOR LINEAR DRIVE

[76] Inventor: Heinz-Ulrich Lewin, Brinksitzerweg 14, D-4600 Dortmund, Fed. Rep. of Germany

[21] Appl. No.: 783,882

[22] Filed: Oct. 29, 1991

Related U.S. Application Data

[62] Division of Ser. No. 607,167, Oct. 31, 1990, Pat. No. 5,088,593.

[30] Foreign Application Priority Data

Nov. 1, 1989 [DE] Fed. Rep. of Germany ....... 3936302

[51] Int. Cl.$^5$ .............................................. B65G 35/00
[52] U.S. Cl. .................................... 198/619; 198/805; 198/840
[58] Field of Search ........................ 198/619, 805, 840

[56] References Cited

U.S. PATENT DOCUMENTS

| | | | |
|---|---|---|---|
| 3,426,887 | 2/1969 | Ward et al. | 198/805 X |
| 3,788,447 | 1/1974 | Stephanoff | 198/805 X |
| 4,601,685 | 7/1986 | Delhaes | 198/840 X |
| 4,792,036 | 12/1988 | Heidelberg | 198/805 X |
| 5,088,593 | 2/1992 | Lewin | 198/619 |

FOREIGN PATENT DOCUMENTS

| | | | |
|---|---|---|---|
| 3741054 | 6/1989 | Fed. Rep. of Germany | 198/805 |
| 1553439 | 3/1990 | U.S.S.R. | 198/805 |

Primary Examiner—Joseph E. Valenza
Assistant Examiner—Tuan N. Nguyen
Attorney, Agent, or Firm—Herbert Dubno; Andrew Wilford

[57] ABSTRACT

A conveyor has an endless belt spanned over upstream and downstream rollers and having upper and lower stretches. The belt has an outer surface adapted to carry a load in the upper stretch and a lower surface turned inward. Permanent magnets are fixed to the inner surface of the belt and a linear-motor stator is provided underneath the upper stretch and juxtaposed with the permanent magnets thereof. The stator and magnets together form a linear motor for advancing the upper stretch downstream. An array of such permanent magnets is imbedded in the lower surface of the belt spaced apart to permit the belt to flex.

6 Claims, 2 Drawing Sheets

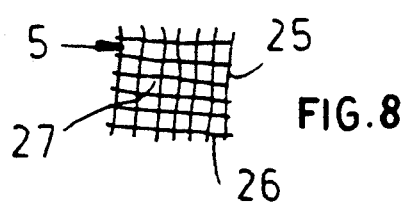
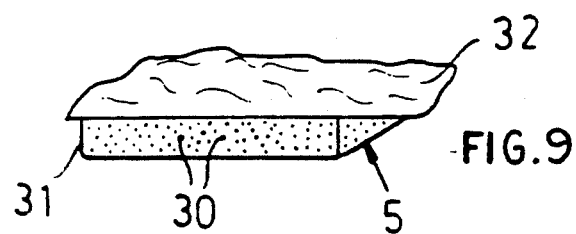
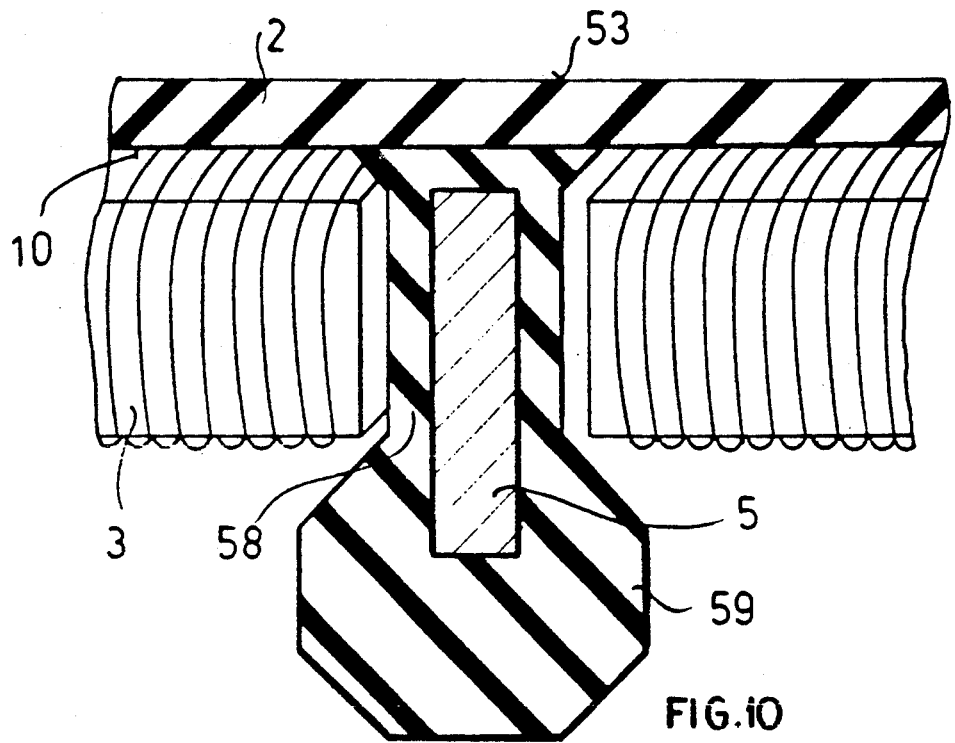
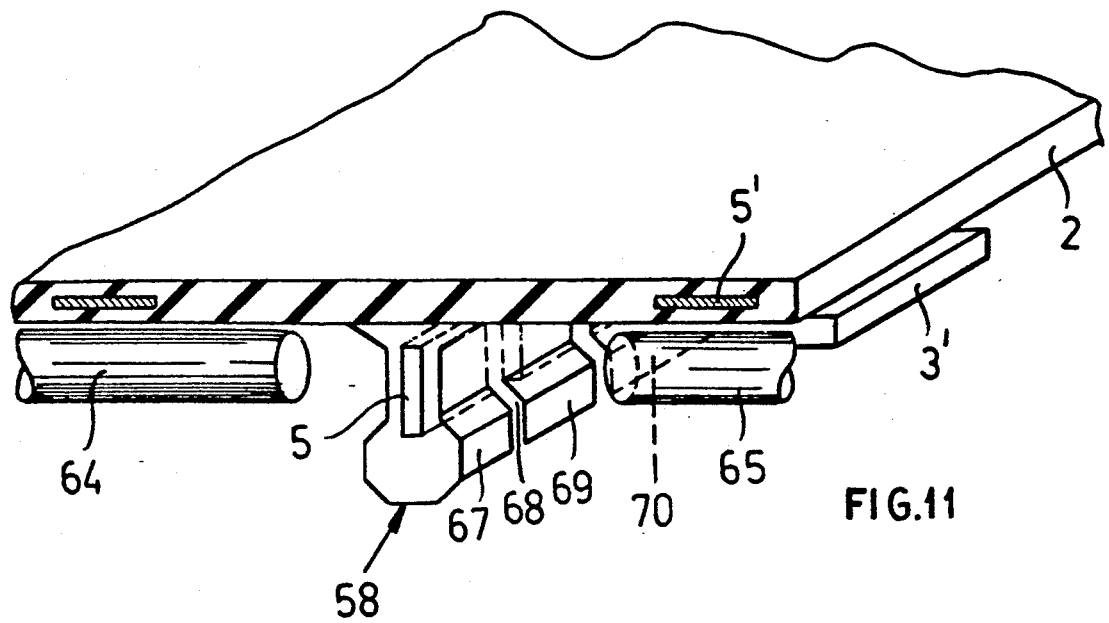

CONVEYOR BELT WITH BUILT-IN MAGNETIC-MOTOR LINEAR DRIVE

CROSS REFERENCE TO RELATED APPLICATION

This application is a division of U.S. Pat. application Ser. No. 07/607,167 filed Oct. 31, 1990, now U.S. Pat. No. 5,088,593.

FIELD OF THE INVENTION

The present invention relates to a conveyor belt. More particularly this invention concerns such a belt adapted to coact with a linear magnetic motor.

BACKGROUND OF THE INVENTION

A standard conveyor-belt system such as used in a mining operation to move ore or the like comprises an endless belt spanned between at least two rollers and having an upper stretch that supports the load and a lower stretch. The downstream roller at least is driven to advance the upper belt stretch in a longitudinal transport direction. Further rollers are provided under the upper stretch at least in long installations to provide support for the upper stretch.

When the system is carrying substantial loads and/or is quite long it is necessary either to provide a succession of belts with the downstream end of each upper stretch passing its load to the upstream end of the next downstream belt, or to provide intermediate drives which engage the upper stretch and pull it in the transport direction. There is an upper limit to the possible length as the friction losses between drive rollers and the belt are substantial, especially when the belt only tangentially engages a roller.

These problems are particularly irksome when used in an underground mining operation as detailed in "Hebezeug and Fördermittel" (18, 1978, pages 76-80) with respect to the use of intermediate drives. The size of such intermediate-drive units in excessive in the tight spaces in mines, and servicing them is almost impossible.

It has accordingly been suggested to imbed permanent magnets in the longitudinal edges of a conveyor belt and to provide C-section stators defining grooves in which these edges run, thereby forming a linear magnetic motor assembly. Synchronizing the driving forces on opposite edges of the belts proves very difficult, and the stators quickly wear out due to entry of grit into the space between the belt and the stator.

OBJECTS OF THE INVENTION

It is therefore an object of the present invention to provide an improved conveyor belt.

Another object is the provision of such an improved conveyor belt which overcomes the above-given disadvantages, that is which can be driven by a linear magnetic motor and which has a long service life.

SUMMARY OF THE INVENTION

A conveyor has an endless belt spanned over upstream and downstream rollers and having upper and lower stretches. The belt has an outer surface adapted to carry a load in the upper stretch and a lower surface turned inward. According to the invention permanent magnets are fixed to the inner surface of the belt and a linear-motor stator is provided underneath the upper stretch and juxtaposed with the permanent magnets thereof. The stator and magnets together form a linear motor for advancing the upper stretch downstream.

With such an arrangement there are no losses to friction whatsoever between drive rollers and the belt, since the rollers idle and do not drive the belt. Instead of a rotary drive motor at the roller, the linear-drive stators provided along the length of the belt make it possible to use a belt of a length that would have been considered impossibly long with a prior-art drive at its ends. The stators are energized with alternating current to form an evenly moving field that smoothly advances the belt. The stators can be spaced longitudinally close enough together to substantially eliminate tension in the belt. They are completely underneath the belt and inward of the longitudinal edges thereof so they are completely protected from the material being transported. Furthermore since the stators have no moving parts, they are virtually maintenance-free.

In accordance with this invention an array of such permanent magnets is imbedded in the lower surface of the belt spaced apart to permit the belt to flex. The magnets can be flat rectangles and have rounded leading and trailing ends relative to a normal travel direction of the belt. Such use of individual magnets like this permits the belt to move around the upstream and downstream rollers without damage to the magnets. Furthermore the use of a succession of discrete magnets ensures that force will be transmitted smoothly to the belt from the stators. Such small magnets are cheap so that the conveyor can be made at low cost, a fact particularly pertinent in a situation with a belt having a length of 100 m or more.

According to this invention a single strip of such magnets is provided on the lower surface down the middle thereof. This completely eliminates the prior-art problems of driving one edge of the belt faster than the other. The leading and trailing ends of the magnets are rounded so they can be closely longitudinally spaced without interfering with one another, and their ends are rounded to facilitate mounting them in place.

The magnets can also be formed as rods extending generally perpendicular to the direction or as balls, making it very easy for the belt to flex without the magnets interfering with one another even whey they touch. When balls of different sizes are used, a high density of magnets can be obtained. They can also be formed of a plurality of criss-crossing magnetized wires forming a mesh imbedded in the lower surface, a plurality of such meshes constituting the permanent magnets. Furthermore the lower surface can be formed with cavities filled with magnetized powder constituting the magnets and imbedded in a flexible gel.

In accordance with a particularly advantageous feature of the invention the lower surface is formed relative to a normal longitudinal travel direction of the belt with a longitudinally extending ridge in which the magnets are imbedded. The ridge has opposite flat longitudinally and vertically extending sides and a thickened outer edge. In addition it is formed with longitudinally spaced inwardly open V-shaped notches and is provided with the magnets between the notches. Thus the belt can flex at the notches. The flat sides of the ridge can furthermore be engaged by centering rollers or the like to keep the belt on center, even if the belt is bent around a curve as is frequently necessary in a mining installation. This eliminates the transfer at corners between separate belt conveyors that was required with prior-art systems.

According to another feature of the invention additional permanent magnets are provided in the belt to each side of the rib and additional stators are juxtaposed with the additional permanent magnets and energized to lift the upper stretch. This can greatly reduce wear on any supporting rolls and also reduce the noise of the conveyor by in effect magnetically floatingly supporting the upper stretch.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 2, 3, 4, 5, 6, 7, 8, and 9 are elevational views of different magnet arrays according to the invention;

FIG. 10 is a large-scale cross section through a conveyor assembly according to the invention; and FIG. 11 is a perspective sectional view of the assembly of FIG. 10.

SPECIFIC DESCRIPTION

Figure 1:
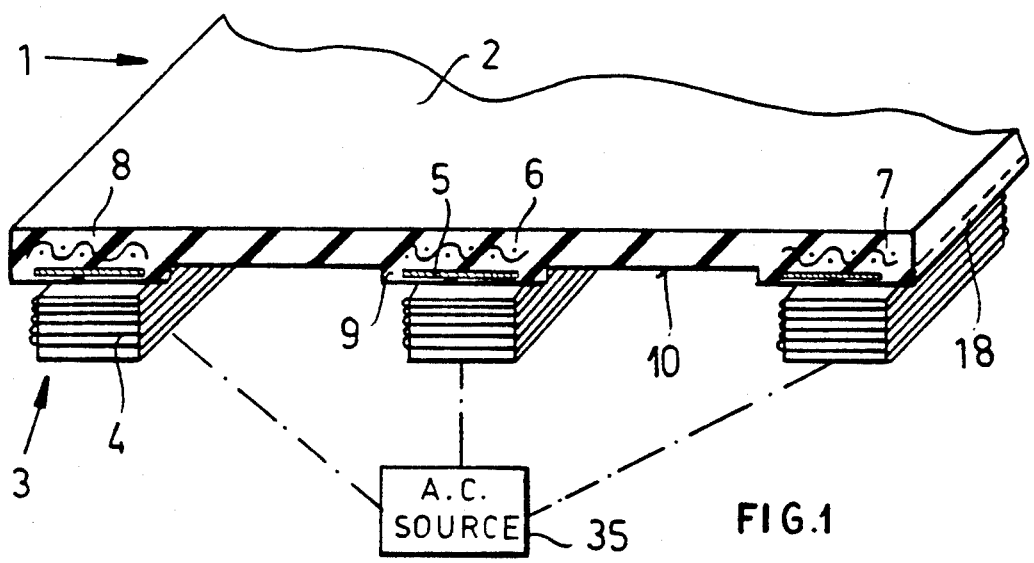
FIG. 1 is a cross section through a belt/motor assembly according to this invention.
Figure 1A:
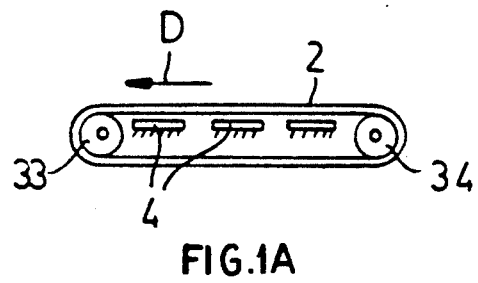
FIG. 1A is a small-scale side view of a conveyor in accordance with this invention.

As seen in FIGS. 1 and 1A a conveyor 1 basically comprises an endless belt 2 spanned over downstream and upstream rollers 33 and 34 spaced apart in a normal travel direction D. The belt 2 has a central reinforced zone 6 extending its full length and similarly reinforced longitudinal edges 7 and 8. In addition the belt 2 has an inner surface 10 provided at each of the reinforced zones 6, 7, and 8 with a ridge 9 in which is imbedded a permanent magnet 5. Under each magnet 5 is a respective stator 4 energized with alternating current from a source shown schematically at 35.

Figure 2:
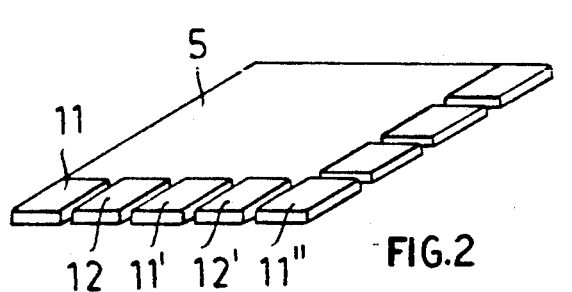
Figure 3:
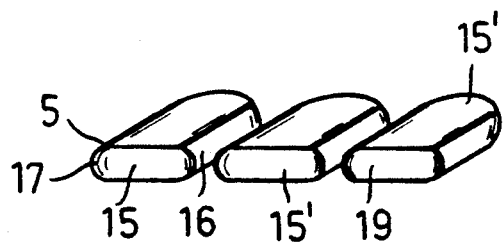

As shown in FIG. 2 each magnet 5 can be formed of five rows of small rectangular and flat magnets 11, 12, 11', 12', and 11" which are spaced apart in and transverse to the travel direction D by such a short distance that the elastomer of the belt 2 does not fill between them. It is also possible as shown in FIG. 3 for individual magnets 15, 15', and 15" to be used which have rounded leading and trailing edges 16 and 17 and even rounded side ends 19. The edges 16 and 17 extend perpendicular to the longitudinal outer edges 18 (FIG. 1) of the belt 2.

Figure 4:
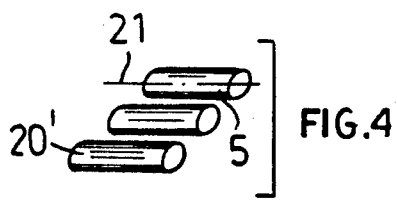
Figure 5:
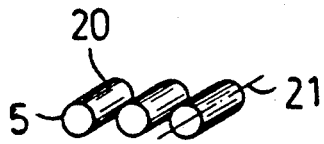
Figure 6:
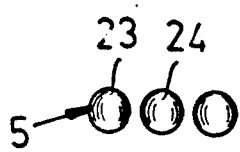

FIGS. 4 and 5 show a magnet 5 formed of short cylindrical rods 20 having axes 21. The magnet rods 20 of FIG. 5 have rounded ends. In FIG. 6 balls 23 and 24 are used to form the magnet 5. Balls of different sizes can be used so they can be packed fairly densely.

Figure 7:
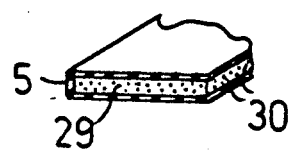

FIG. 7 shows how the ridges 9 can be formed with cavities 29 in which permanent-magnet particles 30 in a gel are held. This arrangement remains flexible while still having sufficient magnetic mass for the force from the stator to work on.

The system of FIG. 8 has a magnet formed as a mesh 27 constituted by longitudinal wires 25 and transverse wires 26. The wires 25 and 26 can be woven or pressed together and a stack of several such meshes 27 can be used.

In FIG. 9 the particles or powder 30 is held in a ridge 31 fixed to a membrane 32 on the underside 10 of the belt 2. Such a ridge 31 extends transverse to the direction D so that it does not impede curving of the belt 2 on which it is carried.

Finally FIGS. 10 and 11 show how the belt 2 can be provided in the middle of its lower surface 10 with a ridge 58 having a pair of vertical flat faces and a thickened lower edge 59. The magnets 5 are imbedded in the ridge 58 which as seen in FIG. 11 is subdivided into succeeding sections 67, 69, 70 by V-shaped notches 68. These notches 68 permit the belt 2 to flex fairly easily. In addition as seen in FIG. 11 support rollers 64 and 65 carry the belt 2 and further magnets 5' can be imbedded in the belt 2 offset from its center to coact with stators 3' that serve to advance and/or lift the belt 2.

I claim:

1. In a conveyor having an endless belt spanned over upstream and downstream rollers, normally traveling in a predetermined travel direction, and having upper and lower stretches, the belt having an outer surface adapted to carry a load in the upper stretch and a lower surface turned inward, the improvement comprising:
   permanent magnets imbedded in the belt adjacent the inner surface of the belt and each having rounded leading and trailing ends relative to the normal travel direction of the belt; and
   a linear-motor stator underneath the upper stretch and juxtaposed with the permanent magnets thereof, the stator and magnets together forming a linear motor for advancing the upper stretch downstream.

2. The conveyor defined in claim 1 wherein an array of such permanent magnets is imbedded in the lower surface of the belt spaced apart to permit the belt to flex.

3. The conveyor defined in claim 1 wherein the lower surface is formed relative to a normal longitudinal travel direction of the belt with a longitudinally extending ridge in which the magnets are imbedded.

4. The conveyor defined in claim 3 wherein the ridge has opposite flat longitudinally extending sides and a thickened outer edge.

5. The conveyor defined in claim 3 wherein the ridge is formed with longitudinally spaced inwardly open notches and is provided with the magnets between the notches, whereby the belt can flex at the notches.

6. The conveyor defined in claim 3, further comprising
   additional permanent magnets in the belt adjacent the ridge and
   an additional stator juxtaposed with the additional permanent magnets and energized to lift the upper stretch.

* * * * *